(12) United States Patent
  Orsley

(10) Patent No.: US 10,684,543 B2
(45) Date of Patent: Jun. 16, 2020

(54) SMART WINDOW PROJECTION SCREEN

(71) Applicant: Corning Incorporated, Corning, NY (US)

(72) Inventor: Timothy James Orsley, San Jose, CA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/093,387

(22) PCT Filed: Apr. 12, 2017

(86) PCT No.: PCT/US2017/027193
§ 371 (c)(1),
(2) Date: Oct. 12, 2018

(87) PCT Pub. No.: WO2017/180734
PCT Pub. Date: Oct. 19, 2017

(65) Prior Publication Data
US 2019/0064647 A1 Feb. 28, 2019

Related U.S. Application Data

(60) Provisional application No. 62/321,395, filed on Apr. 12, 2016.

(51) Int. Cl.
  *G03B 21/608* (2014.01)
  *G02B 26/00* (2006.01)
  (Continued)

(52) U.S. Cl.
  CPC ......... *G03B 21/608* (2013.01); *G02B 5/0242* (2013.01); *G02B 26/005* (2013.01);
  (Continued)

(58) Field of Classification Search
  CPC ....................................................... G03B 21/56
  (Continued)

(56) References Cited

U.S. PATENT DOCUMENTS 4,961,625 A * 10/1990 Wood ..................... G02B 27/01
                                                                          359/630
6,979,499 B2 * 12/2005 Walck ............... B32B 17/10036
                                                                          250/484.4

(Continued)

FOREIGN PATENT DOCUMENTS

EP          3086158 A1 * 10/2016 ........... G02B 26/005
WO   WO-2006017129 A2 *  2/2006 ........... G02B 26/004

OTHER PUBLICATIONS

Robert A. Hayes, Electrowetting-Based Displays: Bringing Microfluidics Alive On-Screen, Philips Research Laboratories IEEE, Jan. 2006, 7 pgs (Year: 7).*

(Continued)

*Primary Examiner* — Clayton E. LaBalle

(57) ABSTRACT

A projection screen for displaying an image is disclosed. The projection screen may comprise an electrode, a plurality of cavities, an upper and lower substrate, and a hydrophobic liquid. The electrode may be disposed on a lower substrate. The hydrophobic liquid may be disposed between the upper substrate and lower substrate. The plurality of cavities may be disposed between the upper and the lower substrates. The projection screen may be associated with the electrode. The projection screen may be configured such that an application of an appropriate voltage to the electrode changes optical properties of the projection screen. Optical properties of the projection screen may comprise transparent and opaque states. Modulation between transparent and opaque states may be in such speed that a viewer sees the projection of a projector on the projection screen in the opaque state as well as sees through the projection screen in the transparent state with no perceived interruptions.

20 Claims, 6 Drawing Sheets

(51) Int. Cl.
  *G03B 37/04* (2006.01)
  *G02B 5/02* (2006.01)
  *G09F 19/18* (2006.01)
  *G03B 21/62* (2014.01)
  *G03B 21/56* (2006.01)
  *G03B 21/58* (2014.01)
  *G03B 21/60* (2014.01)

(52) U.S. Cl.
  CPC ............ *G03B 21/56* (2013.01); *G03B 21/58* (2013.01); *G03B 21/60* (2013.01); *G03B 21/62* (2013.01); *G03B 37/04* (2013.01); *G09F 19/18* (2013.01)

(58) Field of Classification Search
  USPC ........................................................ 359/443
  See application file for complete search history.

(56) References Cited

U.S. PATENT DOCUMENTS

| | | | |
|---|---|---|---|
| 7,072,108 B2 | 6/2006 | Cruz-Uribe et al. | |
| 7,777,960 B2 * | 8/2010 | Freeman | H04N 9/3129 345/7 |
| 7,872,790 B2 * | 1/2011 | Steckl | G02B 26/004 359/253 |
| 9,465,206 B1 * | 10/2016 | Thijssen | G02B 26/005 |
| 2007/0188676 A1 * | 8/2007 | Choi | G02B 3/14 349/62 |
| 2010/0108516 A1 * | 5/2010 | Bartels | G02B 26/005 204/547 |
| 2013/0120825 A1 * | 5/2013 | Lambert | G02B 27/01 359/290 |
| 2013/0120850 A1 * | 5/2013 | Lambert | G02B 27/0101 359/630 |
| 2013/0201547 A1 | 8/2013 | Cho et al. | |
| 2014/0333899 A1 * | 11/2014 | Smithwick | G02B 21/00 353/10 |
| 2015/0015799 A1 * | 1/2015 | Chen | G03B 21/60 349/5 |
| 2015/0253591 A1 * | 9/2015 | Kato | G02B 26/005 359/290 |
| 2017/0261656 A1 * | 9/2017 | Kim | G02B 1/04 |
| 2019/0064647 A1 * | 2/2019 | Orsley | G03B 21/56 |

OTHER PUBLICATIONS

International Search Report and Written Opinion of the International Searching Authority; PCT/US2017/027193; dated Jun. 9, 2017; 11 Pages; European Patent Office.

* cited by examiner

SMART WINDOW PROJECTION SCREEN

CROSS-REFERENCE TO RELATED APPLICATIONS

This application claims the benefit of priority under 35 U.S.C. § 365 of International Patent Application Serial No. PCT/US2017/27193, filed on Apr. 12, 2017, which claims benefit to U.S. Provisional Application Ser. No. 62/321,395 filed on Apr. 12, 2016 the contents of which are relied upon and incorporated herein by reference in their entirety as if fully set forth below.

SUMMARY

The present disclosure relates generally to screens for displaying images, more specifically, to a smart window projection screen that uses electrowetting technology.

In one embodiment, a projection screen may comprise an electrode, and a hydrophobic liquid. The electrode may be disposed on a lower substrate. The hydrophobic liquid may be disposed between the upper and lower substrates. The plurality of cavities may be disposed between the upper and lower substrates. The projection screen may be configured such that an application of an appropriate voltage to the electrodes changes optical properties. Optical properties may comprise transparent and opaque states. Modulation between transparent and opaque states may be in such a speed that a viewer sees the projection of a projector on the projection screen in the opaque state as well as sees through the projection screen in the transparent state with no perceived interruptions.

In another embodiment, a projection screen may comprise an electrode disposed on a lower substrate, an upper substrate, and a hydrophobic liquid. The hydrophobic liquid may be disposed between the upper substrate and the lower substrate. The hydrophobic liquid may comprise a plurality of particles. The hydrophobic liquid may be movable under an appropriate voltage such that the projection screen is configured to modulate optical properties between opaque and transparent states. The modulation between transparent and opaque states may be in such a speed that a viewer sees through the projection screen with no perceived interruptions.

In a further embodiment, a screen for displaying an image may comprise a display surface and a hydrophobic liquid. The display surface may be associated with an electrode. The hydrophobic liquid may comprise a plurality of particles. The hydrophobic liquid may be movable under an appropriate voltage such that the screen is configured to modulate optical properties between opaque and transparent states. The modulation between transparent and opaque may be in such a speed that a viewer sees through the projection screen with no perceived interruptions.

Additional features and advantages of the present disclosure will be set forth in the detailed description, which follows, and in part will be readily apparent to those skilled in the art from that description or recognized by practicing the embodiments described herein, including the detailed description, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

Figure 1:
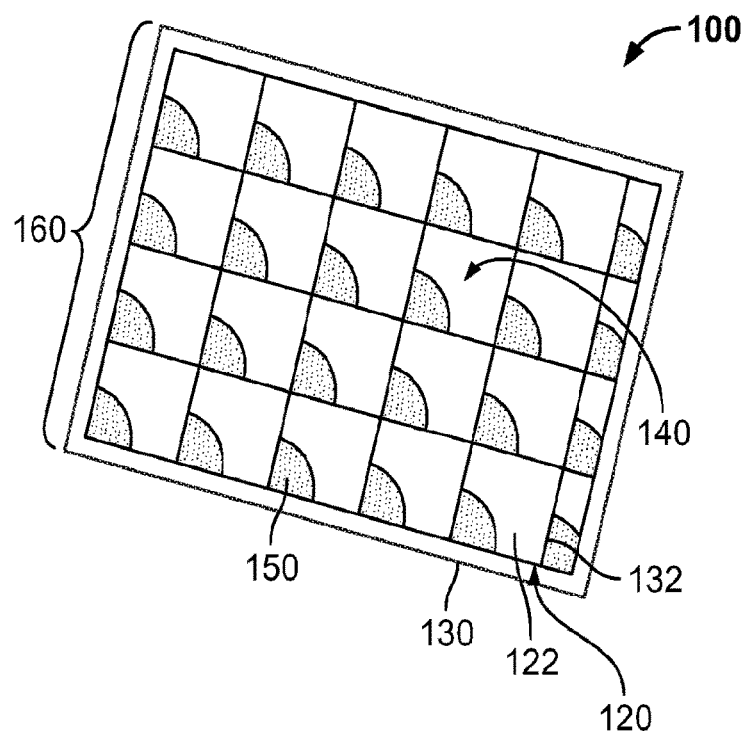
FIG. 1 is a plan view of a projection screen with showing multiple cavities according to one embodiment.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed, specific reference of each various individual and collective combinations and permutation of these compounds may not be explicitly disclosed, yet each is specifically contemplated and described herein.

Reference will now be made in detail to the present preferred embodiment(s), examples of which are illustrated in the accompanying drawings. The use of a particular reference character in the respective views indicates the same or like parts.

Broadly, the present disclosure relates to screens for displaying images, and more specifically, to a smart window projection screen. The smart window projection screen may have a white opaque state to be used as a projection screen. The smart window projection screen may have a transparent state so that a viewer can see through the screen. The smart window display may be modulated between the transparent state and the white opaque state sufficiently rapidly that a viewer may see through the projection screen with no perceived interruptions. The modulation frequency may be about 60 Hz. The modulation may be achieved by the electrowetting effect.

The electrowetting effect may be defined as a change in solid-electrolyte contact angle due to an applied potential difference between the solid and the electrolyte. The phenomenon of electrowetting can be understood in terms of the forces that result from the applied electric field. The fringing field at the corners of the electrolyte droplet tends to pull the droplet down onto the electrode, lowering the macroscopic contact angle and increasing the droplet contact area. Alternatively, electrowetting may be viewed from a thermodynamic perspective.

As shown in FIG. 1, a plan view of a portion of a projection screen 100 in a transmissive view comprises an electrode 130, a plurality of cavities 122, an upper substrate 140, and a hydrophobic liquid 150. A wall 132 may be used to divide the plurality of cavities 122. The electrowetting panel 160 may be configured in such that an application of an appropriate voltage to the electrodes changes optical properties. Optical properties of the associated display region may comprise transparent and opaque. Modulation between transparent and opaque states may be in such a speed that a viewer sees a projection on the projection screen in the opaque state as well as sees through the projection screen in the transparent state with no perceived interruptions. The opaque state may have more than about 95% haziness. The modulation may be about 60 Hz, at which frequency the viewer would not be able to "notice" the modulation.

FIG. 1 shows a typical hydrophobic liquid retraction obtained for a group of cavities with a size of 160×160 square microns. In a typical electrowetting panel, about 80% of the plan view is transparent in the transparent state. The upper substrate and lower substrate may be transparent with less than about 1% haziness. Part of the electrode is omitted in the lower left corner of each electrode to control hydrophobic liquid 150 motion.

Figure 2:
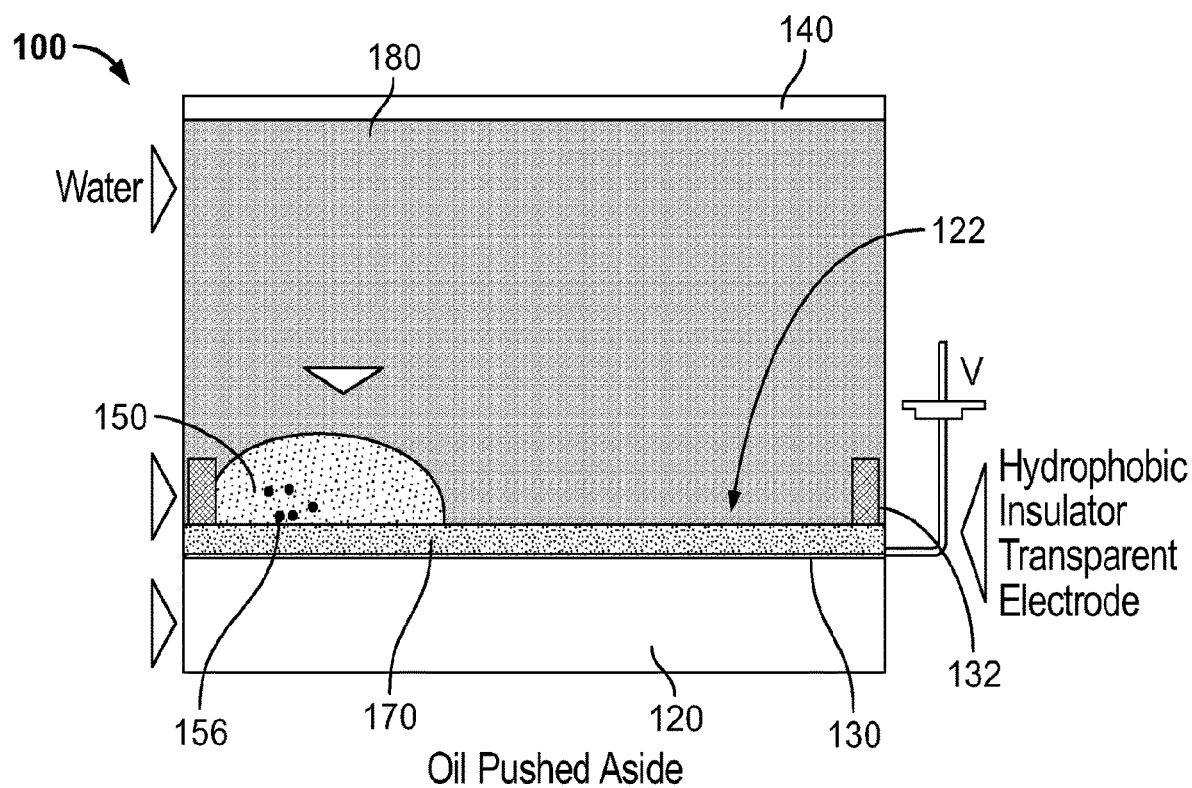
FIG. 2 is an enlarged cross-sectional view of a cavity inside a projection screen in a transmissive mode.

FIG. 2 illustrates the electrowetting panel in a transmissive mode of the projection screen 100. As shown in FIG. 2, the upper substrate 140 and lower substrate 120, made of glass, for example, are transparent. The hydrophobic liquid 150 may comprise a plurality of particles 156. The plurality of particles 156 may comprise a plurality of pigments. The pigments may comprise titanium dioxide ($TiO_2$), zinc oxide, or calcium carbonate. The pigments may be white in color. The projection screen 100 may further include hydrophilic liquid 180, such as water, which is immiscible with the hydrophobic liquid 150, such as oil, hexane, cyclohexane, benzene, xylene, for example. The hydrophilic liquid 180 may not mix with the hydrophobic liquid 150. The hydrophobic liquid 150 may be movable under an appropriate voltage in such that the associated display regions may be in the transparent state. The projection screen 100 may further include a hydrophobic insulator 170, such as plastic. The hydrophobic insulator 170 may separate the hydrophobic liquid 150 and the lower substrate 120. A plurality of cavities 122 may be disposed between the upper substrate 140 and the lower substrate 120. In a panel, the layers of the electrode 130, the hydrophobic insulator 170, the hydrophobic liquid 150 and the hydrophilic liquid 180 may be sandwiched between glass substrates.

In operation, when a voltage difference is applied across the hydrophobic insulator 170, an electrostatic term is added to the energy balance and the stacked state is no longer energetically favorable. The system may lower its energy by moving the hydrophilic liquid 180, i.e., water, into contact with the insulator, thereby displacing the hydrophobic liquid 150 (FIG. 2) and exposing the underlying transparent surface.

The balance between electrostatic and surface tension forces determines how far the hydrophobic liquid is moved to the side as shown in FIG. 2. The lower substrate can be made reflective by adding a reflector underneath the stack.

Figure 3:
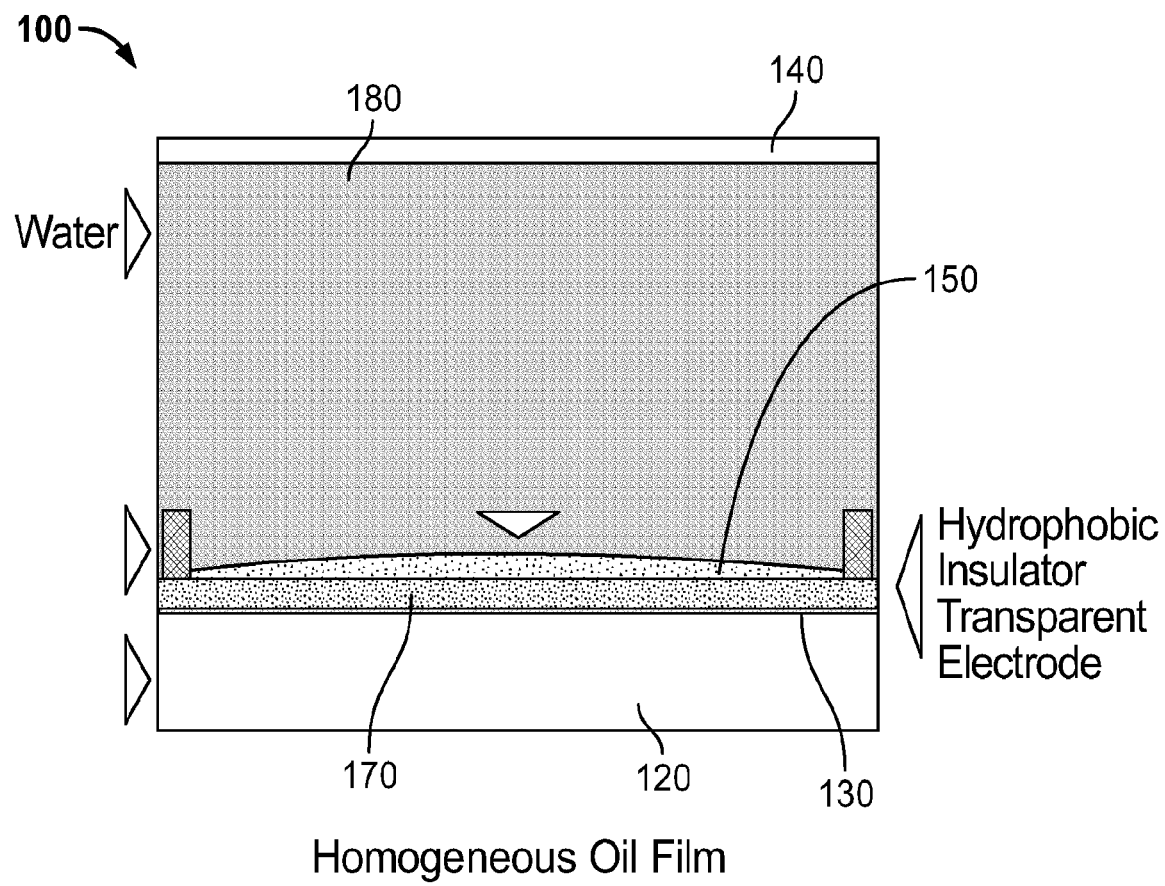
FIG. 3 is an enlarged cross-sectional view of a cavity inside a projection screen in a reflective mode.

FIG. 3 illustrates a reflective mode of the electrowetting panel of the projection screen 100. As shown in FIG. 3, in equilibrium, the hydrophobic liquid 150 may form a continuous film between the hydrophilic liquid 180, such as water, and the hydrophobic insulator 170 due to the fact that this is the lowest energy state of the system. At a typical length scales used in the display (i.e., cavity sizes around or below 200 microns), the surface tension force may be more than 1,000 times stronger than the gravitational force. As a result, the hydrophobic liquid is stable in all orientations.

Figure 4:
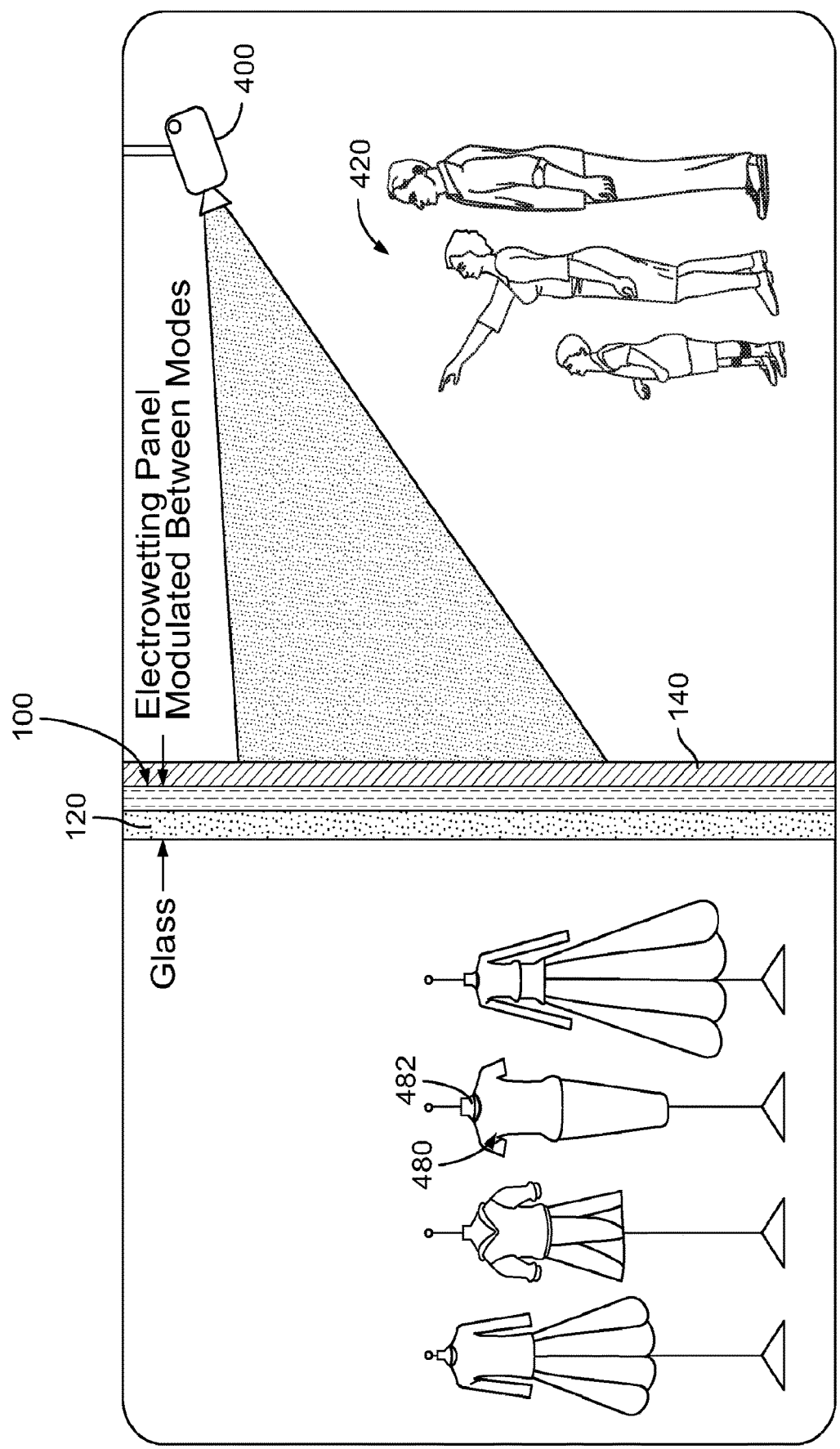
FIG. 4 illustrates a projection screen in use when the projection screen is opaque.

As shown in FIG. 4, viewers 420 may stand in front of the projection screen 100, a projector 400 may project an image onto the projection screen 100. The hydrophobic liquid that has white particles, such as titanium dioxide, zinc oxide, or calcium carbonate, may be gathered in the transmissive mode, but may spread out in the reflective mode. In the transmissive mode, the projection screen may allow the physical objects in the window to be seen. In the reflective mode, the electrowetting panel can act as a projection screen so that when front-projected by a projector, the projection screen may act as a display.

The projection screen 100 can be used as a display window of a clothing store that may have various clothing 480 on mannequins 482.

Figure 5:
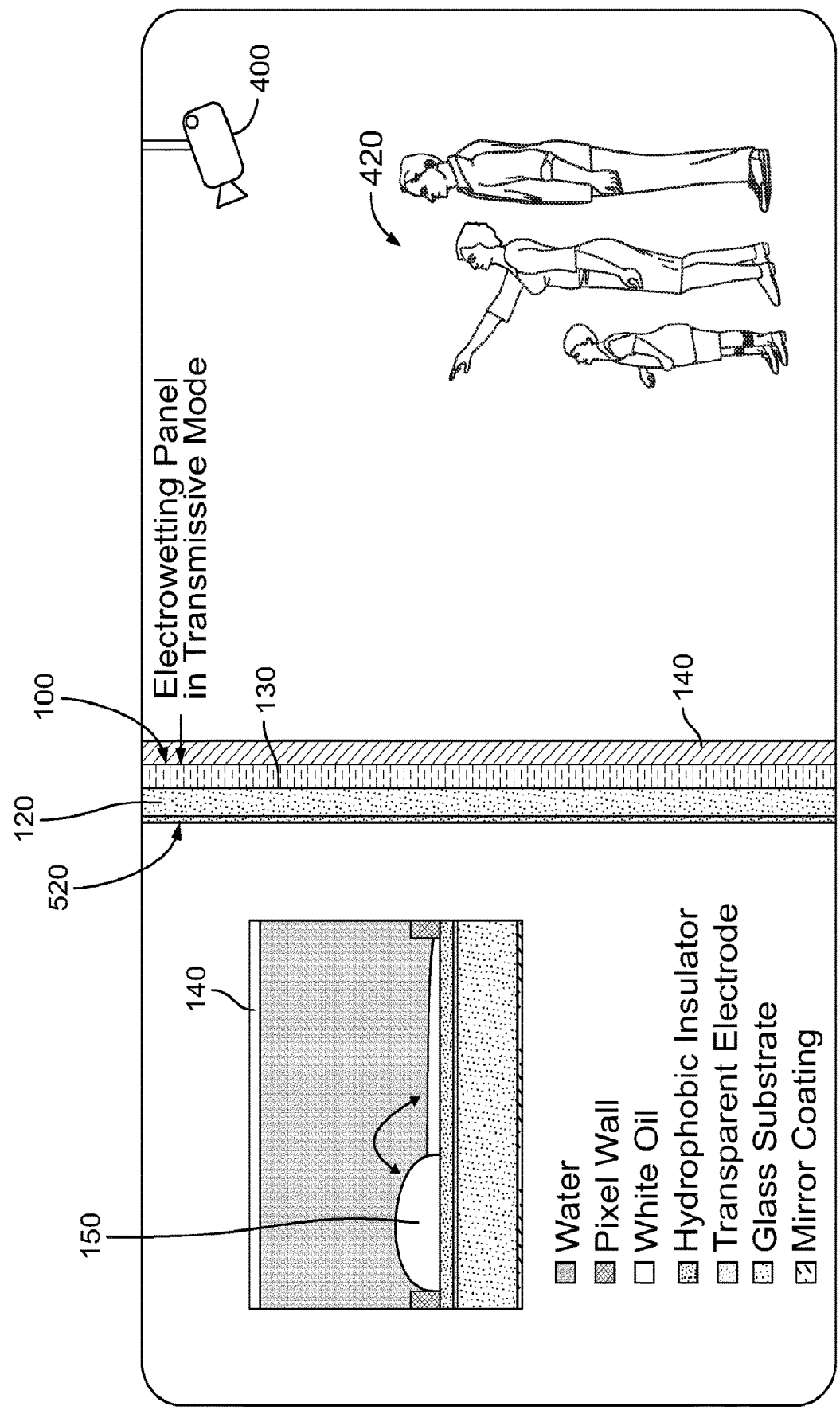
FIG. 5 illustrates a projection screen in use when the projection screen is in a transmissive mode.

As shown in FIG. 5, the projection screen 100 may further include a coating 520 to the lower substrate 120. The lower substrate 120 may be sandwiched between the coating 520 and the electrodes 130. The coating 520 together with the lower substrate 120, such as glass, may be used as a mirror so the users standing in front of the projection screen 100 can see themselves when the projection screen is in transmissive mode. In other times, such as in the reflective mode, the projection screen 100 may act as a screen for displaying an image. Alternatively, FIG. 5 does not have a mirror coating.

Figure 6:
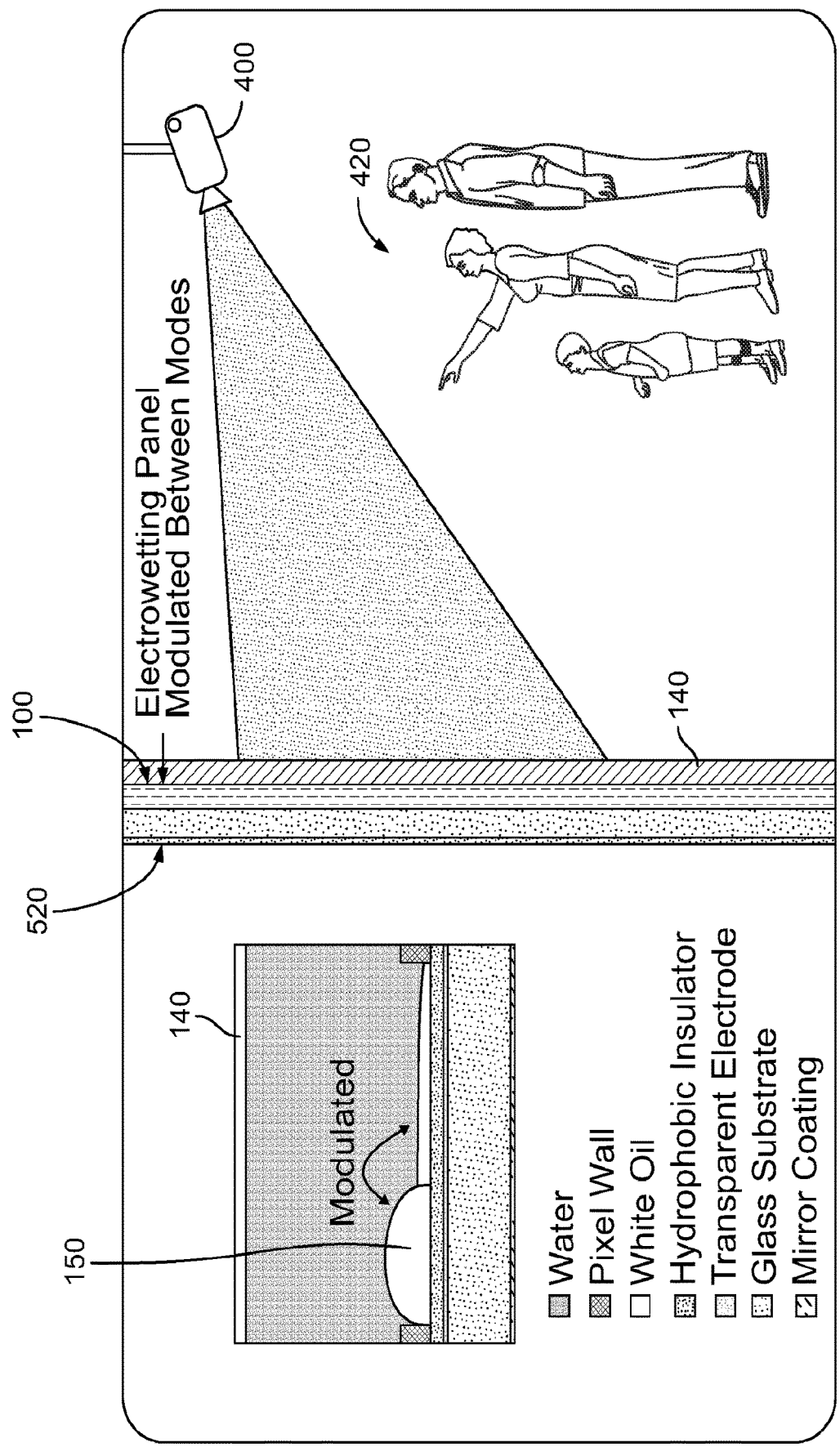
FIG. 6 illustrates a projection screen having a mirror coating in use when the projection screen is modulated between modes.

As shown in FIG. 6, by modulating quickly between mirror and display mode, the viewer 420 may achieve a form of augmented reality. For example, in a dressing room, one could show someone "wearing" a piece of virtual clothing.

Figure 7:
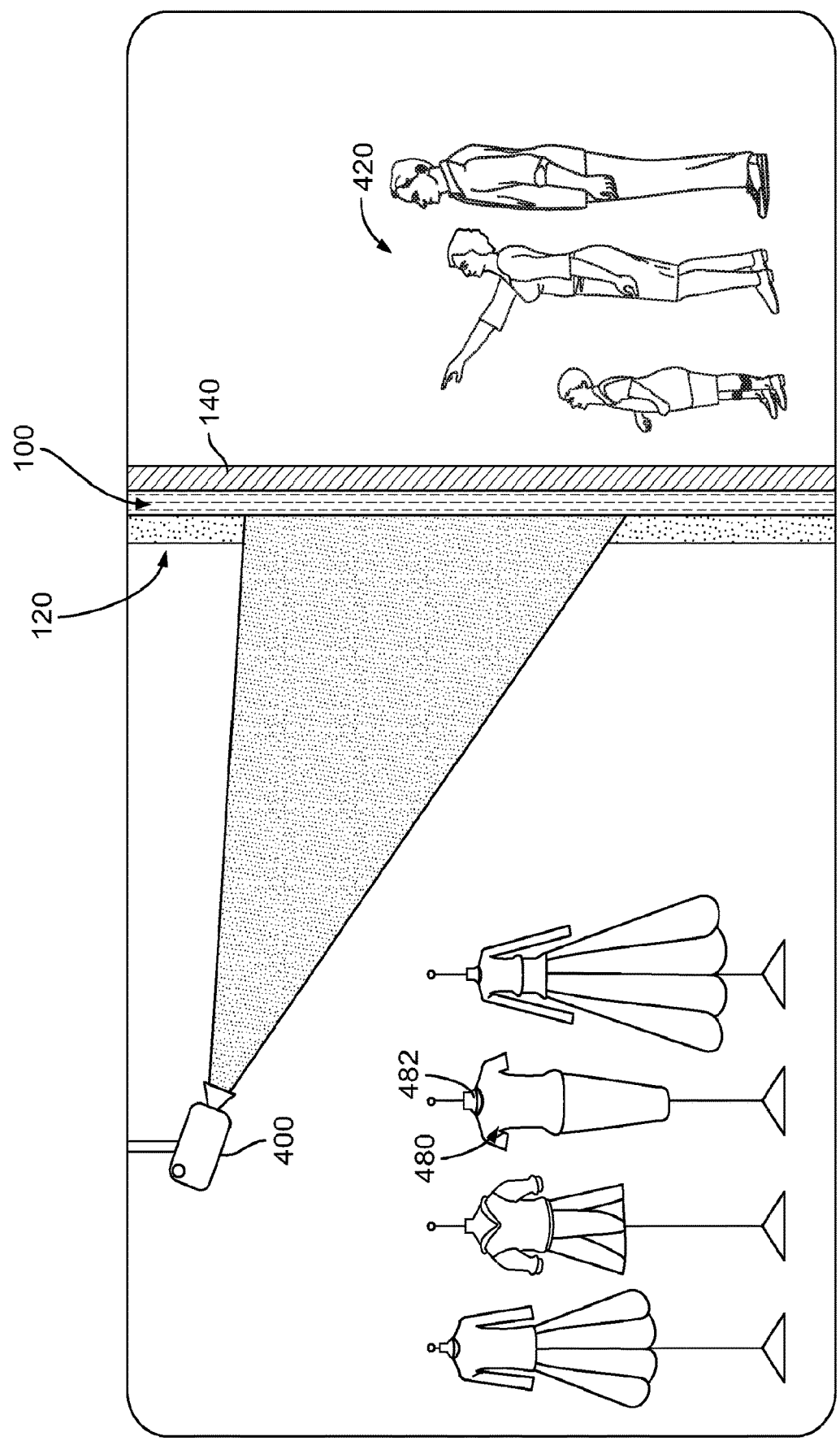
FIG. 7 illustrates a projection screen in use when the projection screen is modulated between transparent and scattering modes.

Optical properties of the associated display region may further comprise a scattering state in addition to the transparent and opaque states. The scattering state may be achieved by loading the hydrophobic liquid with fewer particles. In an opaque state, the projection may be from the front as shown in FIG. 6, whereas in a scattering state, the projector 400 may be from the rear as shown in FIG. 7. This instance may be advantageous. For example, this embodiment of the projection screen 100 may be used as a retail store front. Users 420 could see the projection images on the projection screen 100 and learn more digitally through the projected images about various clothing 480. The projection screen 100 may be a touch screen in such a way that the users 420 may touch the screen and buy the dress that the viewers virtually tried on. The projection screen 100 may act as a dispensing machine screen whereby the viewers may get the dress from a slot of the machine. Additionally, viewers may be able to interact with a portable electronic device, e.g., a smart phone, etc., by using a phone application so that information may be relayed, images may be uploaded, or items may be bought.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. For example, FIGS. 1-7 are merely a schematic illustration of screen for displaying images or the projection screen 100 according to one embodiment of the present disclosure. A variety of projection screen configurations are contemplated herein, the structural details of which may be conveniently gleaned from the present description, the accompanying drawings, and the appended claims. FIGS. 1-7 are presented for illustrative purposes and are not intended to create a presumption that each of the various aspects illustrated therein is a necessary part of the various embodiments contemplated herein.

The claims appended hereto should be taken as the sole representation of the breadth of the present disclosure and the corresponding scope of the various embodiments described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is also noted that recitations herein of "at least one" component, element, etc., should not be used to create an inference that the alternative use of the articles "a" or "an" should be limited to a single component, element, etc.

It is further noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, are to be taken as a definite recitation of the structural characteristics of the component.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A projection screen, comprising:
   an electrode disposed on a lower substrate;
   an upper substrate;
   a plurality of cavities disposed between the lower substrate and the upper substrate; and
   a hydrophobic liquid disposed between the lower substrate and the upper substrate,
   wherein the hydrophobic liquid comprises a plurality of pigments,
   wherein the projection screen is associated with the electrode,
   wherein the projection screen is configured such that an application of an appropriate voltage to the electrode changes optical properties of the projection screen,
   wherein optical properties comprise transparent and opaque states,
   wherein modulation between the transparent and opaque states is in such a speed that a viewer sees a projection of a projector on the projection screen in the opaque state as well as sees through the projection screen in the transparent state with no perceived interruptions.

2. The projection screen of claim 1, wherein the upper substrate and lower substrate are transparent with less than about 1% haziness.

3. The projection screen of claim 1, wherein the plurality of pigments comprise at least one of titanium dioxide, zinc oxide, or calcium carbonate.

4. The projection screen of claim 1, further comprising hydrophilic liquid, wherein the hydrophilic liquid is immiscible with the hydrophobic liquid and wherein the hydrophobic liquid is movable under an appropriate voltage such that the projection screen is in the transparent state with less than about 1% haziness.

5. A projection screen, comprising:
   an electrode disposed on a lower substrate;
   an upper substrate; and
   a hydrophobic liquid disposed between the upper substrate and the electrode,
   wherein the hydrophobic liquid comprises a plurality of pigments,
   wherein the hydrophobic liquid is movable under an appropriate voltage such that an associated display region is configured to modulate optical properties between transparent and opaque states,
   wherein modulation between the transparent and opaque states is in such a speed that a viewer sees a projection of a projector on the projection screen in the opaque state as well as sees through the projection screen in the transparent state with no perceived interruptions, wherein the projection screen is configured such that an application of an appropriate voltage to the electrode changes optical properties of the projection screen.

6. The projection screen of claim 5 further comprising a plurality of cavities disposed between the lower substrate and the upper substrate.

7. The projection screen of claim 5, wherein the upper substrate and lower substrate are transparent with less than about 1% haziness.

8. The projection screen of claim 5, wherein the plurality of pigments comprise at least one of titanium dioxide, zinc oxide, or calcium carbonate.

9. The projection screen of claim 5, further comprising hydrophilic liquid, wherein the hydrophilic liquid is immiscible with the hydrophobic liquid.

10. A screen for displaying an image, comprising:
a display surface, wherein the display surface associates with an electrode; and
a hydrophobic liquid in a cavity comprising a plurality of pigments,
wherein the hydrophobic liquid is movable under an appropriate voltage such that a display region is configured to modulate optical properties between opaque and transparent states,
wherein modulation between the transparent and opaque states is in such a speed that a viewer sees a projection of a projector on the screen in the opaque state as well as sees through the screen in the transparent state with no perceived interruptions.

11. The screen of claim 10 further comprising an upper substrate and a lower substrate, wherein the hydrophobic liquid is sandwiched between the upper substrate and lower substrate.

12. The screen of claim 11, wherein the cavity is disposed between the upper and lower substrates.

13. The screen of claim 10, wherein pigments comprise at least one of titanium dioxide, zinc oxide, or calcium carbonate.

14. The screen of claim 10, wherein the upper and lower substrate are transparent with less than about 1% haziness.

15. The screen of claim 10, wherein the electrode is disposed on the lower substrate.

16. The screen of claim 10, further comprising hydrophilic liquid in the cavity, wherein the hydrophilic liquid is immiscible with the hydrophobic liquid.

17. The screen of claim 10, wherein the plurality of pigments are white.

18. The screen of claim 10, further comprising a coating to the lower substrate, wherein the lower substrate is sandwiched between the coating and the electrode.

19. The screen of claim 10, wherein the projector is at an opposite side of the screen from the viewer and the optical properties further include a scattering state.

20. The screen of claim 19, wherein modulation between transparent and scattering states is in such a speed that a viewer sees a projection of the projector on the screen in the scattering state as well as sees through the screen in the transparent state with no perceived interruptions.

* * * * *